(12) United States Patent
Haslacher et al.

(10) Patent No.: US 9,781,200 B2
(45) Date of Patent: Oct. 3, 2017

(54) SYSTEM, APPARATUS, AND METHOD FOR MEASURING NUMBER OF USER STEPS

(71) Applicant: Step Buddies, Upland, CA (US)

(72) Inventors: Christian R Haslacher, Upland, CA (US); Anish Patel, Fontana, CA (US); Ulrike Haslacher, Upland, CA (US)

(73) Assignee: STEPBUDDIES INTERNATIONAL, Upland, CA (US)

( * ) Notice: Subject to any disclaimer, the term of this patent is extended or adjusted under 35 U.S.C. 154(b) by 0 days.

(21) Appl. No.: 14/435,384

(22) PCT Filed: Jun. 27, 2014

(86) PCT No.: PCT/US2014/044548
§ 371 (c)(1),
(2) Date: Apr. 13, 2015

(87) PCT Pub. No.: WO2015/002827
PCT Pub. Date: Jan. 8, 2015

(65) Prior Publication Data
US 2015/0237126 A1 Aug. 20, 2015

Related U.S. Application Data

(60) Provisional application No. 61/841,875, filed on Jul. 1, 2013.

(51) Int. Cl.
*G08B 23/00* (2006.01)
*H04L 29/08* (2006.01)

(52) U.S. Cl.
CPC ................ *H04L 67/1085* (2013.01)

(58) Field of Classification Search
CPC ................................... H04L 67/1085
USPC ............... 340/573.1, 539.11, 870.16, 573.7; 368/10; 455/456.1, 556.1; 36/136, 107, 36/103, 140, 105, 132, 29, 91; 370/329; 702/160
See application file for complete search history.

(56) References Cited

U.S. PATENT DOCUMENTS

| 4,402,147 A | 9/1983 | Wu |
| 4,510,704 A * | 4/1985 | Johnson .................. A43B 3/00 235/105 |
| 4,703,445 A | 10/1987 | Dassler |

(Continued)

OTHER PUBLICATIONS

Lee W. Young, "Written Opinion of the International Searching Authority", for International Application No. PCT/US14/44548 mailed on Oct. 24, 2014.

(Continued)

*Primary Examiner* — Dhaval Patel
(74) *Attorney, Agent, or Firm* — LeonardPatel PC (57) ABSTRACT

A system for counting shoe and uploading data to a centralized server. The system includes a shoe that counts the number of steps a user takes during a predefined period of time. When the number of steps are greater than a predefined number, e.g., a target, the shoe displays a message congratulating the user. For example, when the target is reach, the display will show a winner message on the shoe. The shoe may be placed on a charging (or docking) station, allowing the shoe to be charged. The charging station may also download the data from the shoe, and transmit the data to a central server.

4 Claims, 9 Drawing Sheets

(56) References Cited

U.S. PATENT DOCUMENTS

| | | | | |
|---|---|---|---|---|
| 6,298,314 | B1* | 10/2001 | Blackadar | A61B 5/1121 235/105 |
| 7,676,961 | B2* | 3/2010 | DiBenedetto | A43B 1/0009 36/132 |
| 7,854,077 | B1* | 12/2010 | Jauregui | A43B 1/0036 36/136 |
| 2003/0009308 | A1 | 1/2003 | Kirtley | |
| 2009/0238400 | A1* | 9/2009 | Im | A43B 3/0005 381/388 |
| 2009/0278707 | A1 | 11/2009 | Biggins et al. | |
| 2011/0119027 | A1* | 5/2011 | Zhu | G01C 22/006 702/160 |
| 2012/0053657 | A1 | 3/2012 | Parker et al. | |
| 2012/0143428 | A1 | 6/2012 | Kim et al. | |
| 2013/0019503 | A1 | 1/2013 | Vogt | |
| 2013/0106684 | A1 | 5/2013 | Weast et al. | |
| 2013/0247424 | A1* | 9/2013 | Tseng | A43B 3/0005 36/136 |
| 2014/0345167 | A1* | 11/2014 | Al-Ani | A43B 7/00 36/25 R |

OTHER PUBLICATIONS

Lee W. Young, "International Search Report", for International Application No. PCT/US14/44548 mailed on Oct. 24, 2014.

\* cited by examiner

SYSTEM, APPARATUS, AND METHOD FOR MEASURING NUMBER OF USER STEPS

CROSS REFERENCE TO RELATED APPLICATION

This application is a National Stage Application under 35 U.S.C. §371 of, and claims priority to, International Application No. PCT/US2014/044548, filed on Jun. 26, 2014, which claims the benefit of U.S. Provisional Patent Application Ser. No. 61/841,875, filed on Jul. 1, 2013. The subject matter of these earlier-filed applications is hereby incorporated by reference in its entirety.

FIELD

The present invention generally pertains to counting user steps and, more particularly, to a counting a number of steps a user takes until a certain goal is reached and sharing the number of steps the user take with a community.

BACKGROUND

In the last decade, many clinical studies have demonstrated that adults and, in particular, children are less active. The inactivity leads to a decrease in activity and has alarming negative consequences for kids that jeopardizes their future as healthy adults. On average, a male child, for example, should take approximately 15,000.00 walking steps (hereinafter "steps") a day, while a female child should take approximately 12,000 steps a day. This number may increase for a male or female adult. It should be appreciated that a child should take 2,500 steps or 5,000 in a 24 hour period to equal to 30 minutes or 60 minutes of working out.

However, with video gaming and other electronic devices, children, for example, are less likely to take the number of steps to reduce his or her risk to cancer, diabetes, high blood pressure, etc. In fact, children may not even walk 2,500 steps in a day. Thus, a shoe designed to challenge a user to take additional daily steps may be beneficial.

SUMMARY

Certain embodiments of the present invention may provide solutions to the problems and needs in the art that have not yet been fully identified, appreciated, or solved by current health training systems. For example, in one embodiment, a shoe may count the number of steps a user takes in a day. Once a goal (e.g., a predetermined number of steps have been taken by the user) is reached, the shoe notifies the user that the goal is reached. The shoe may be recharged via a docking or charging station. The docking station may download data from the shoe, and upload the data to a cloud-based application. The cloud application may act as a social platform allowing the user to communicate his or her accomplishments with others, thus encouraging fitness.

In one embodiment, an apparatus includes a counter configured to count a number of steps. The apparatus also includes a display configured to display the number of steps taken during a predefined period of time, and display a message when the number of steps is greater or equal to a predefined number of steps.

In another embodiment, an apparatus includes a sensor configured to detect whether a pair of shoes are placed within a predefined area on the apparatus. The apparatus also includes a power supply configured to charge one of the pair of shoes.

In another embodiment, a system includes a shoe and a charging station. The shoe is configured to count a number of steps taken during a predefined period of time, and display a message when the number of steps is greater or equal to a predefined number of steps. The charging station is configured to charge the shoe, and download data from the shoe.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention pertain to a shoe that includes a step counter. The step counter is configured to count the number of steps that a user takes during a predefined period of time, e.g., during a twenty-four hour period. The shoe also includes a screen to display the number of steps taken during the predefined period of time, and display a message to the user of the shoe when a goal, i.e., a predefined number of steps, is met.

Figure 1A:
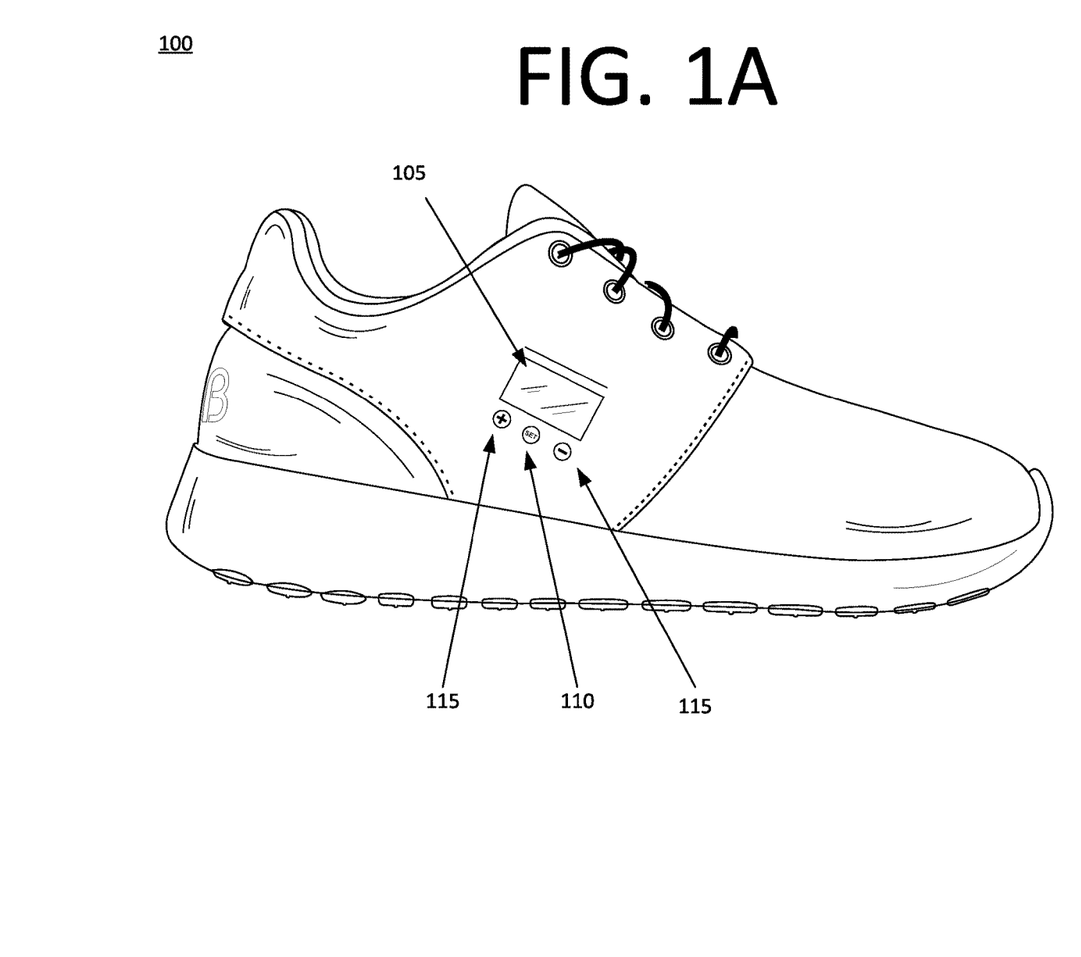
FIGS. 1A-1C illustrates a shoe for counting steps, according to an embodiment of the present invention.
Figure 1B:
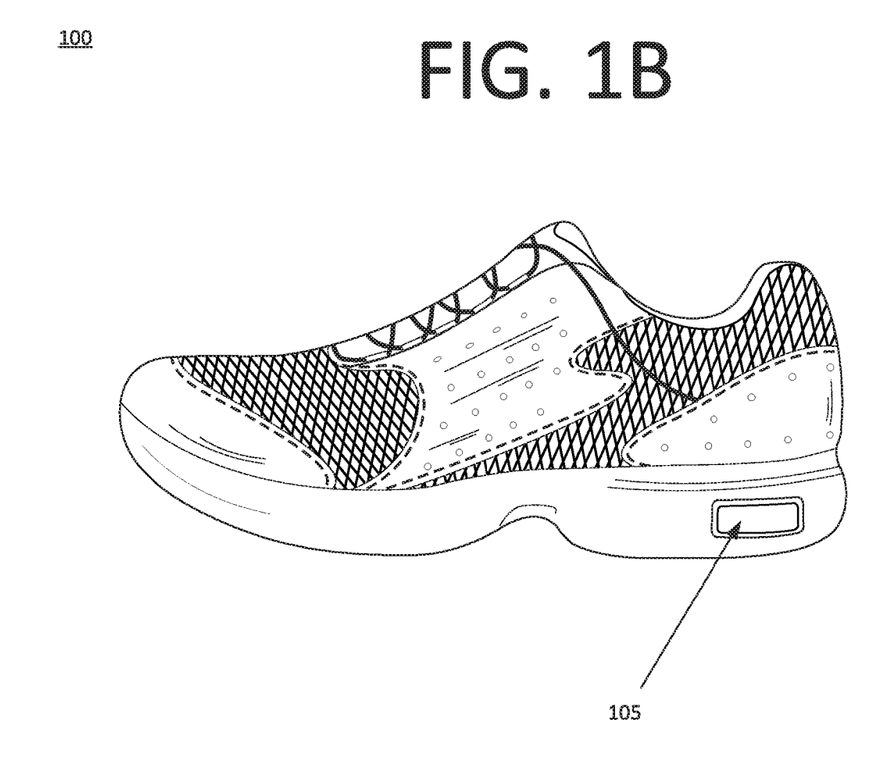
Figure 1C:
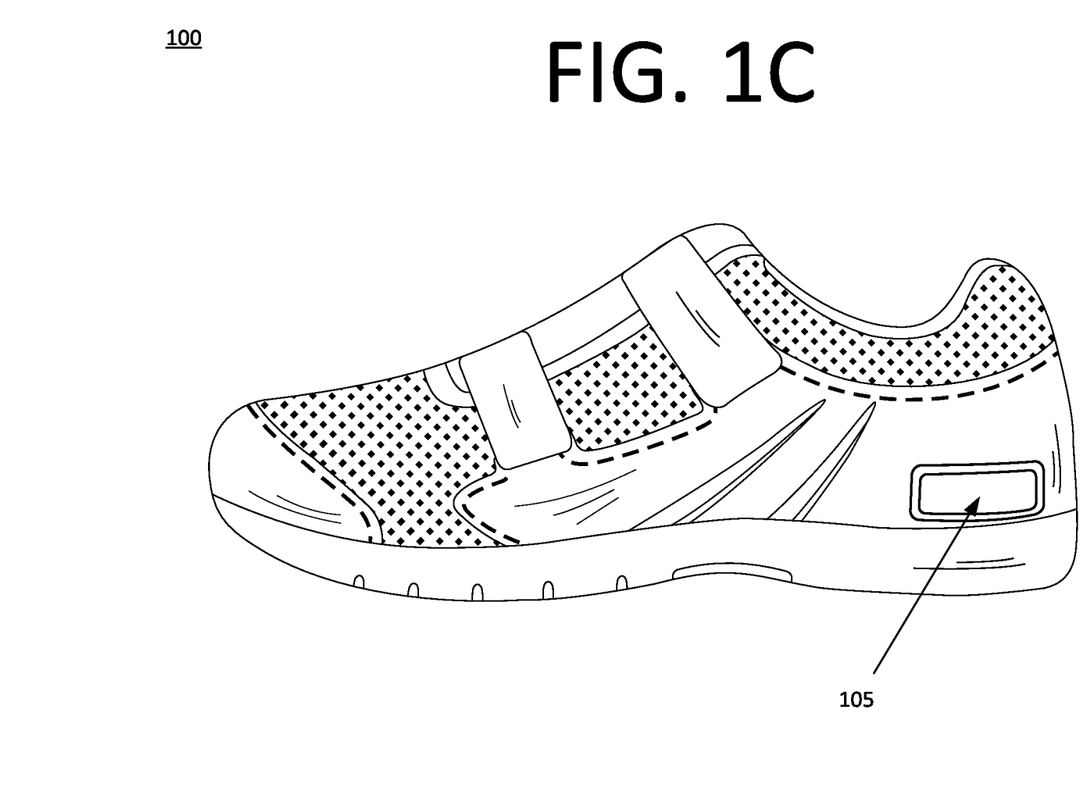
Figure 1D:
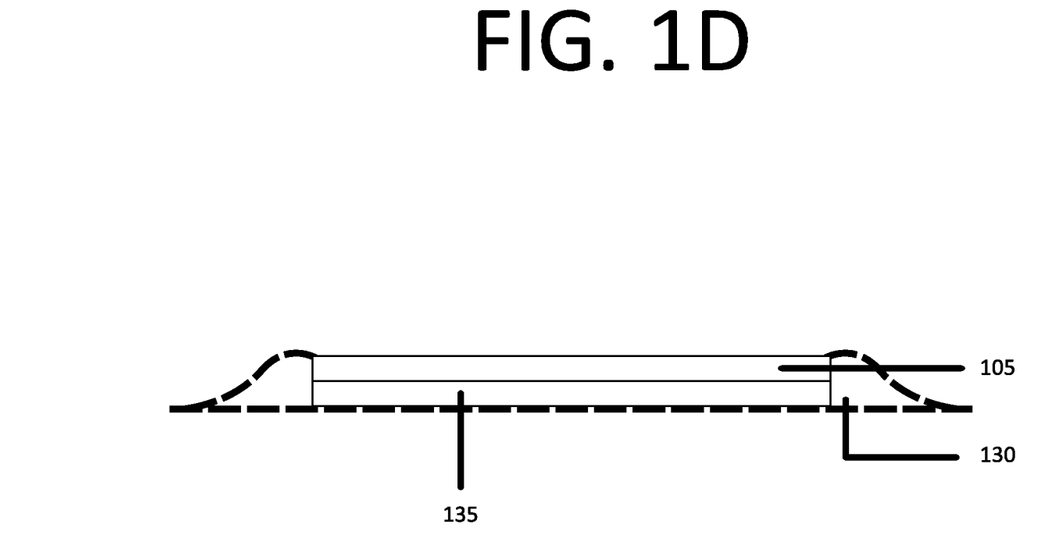
FIGS. 1D-1F illustrates a display for the shoe, according to an embodiment of the present invention.

FIGS. 1A-1C illustrates a shoe 100 for counting steps, according to an embodiment of the present invention. Shoe 100 includes a display 105 configured to display the number of steps that a user takes during the predefined period of time. In one embodiment, display 105 may be embedded within the material 130 of shoe 100. See, for example FIG. 1D, which shows display 105 including its circuitry 135 embedded within material 130, i.e., the shoe fabric. In another embodiment, display 105 may slightly protrude out of shoe 100. For example, material 130 may cover circuitry 135, while allowing display 105 to protrude of out material 130.

It should be appreciated that the location of display 105 is not dependent upon the functionality of the shoe. For example, display 105 may be located on the left or right shoe, on the left side or right side of either pair of the shoe, on the side of the sole of the shoe, on a strap of the shoe, or any location that would be appreciated by a person of ordinary skill in the art. See, for examples, FIGS. 1A-1C.

Figure 1E:
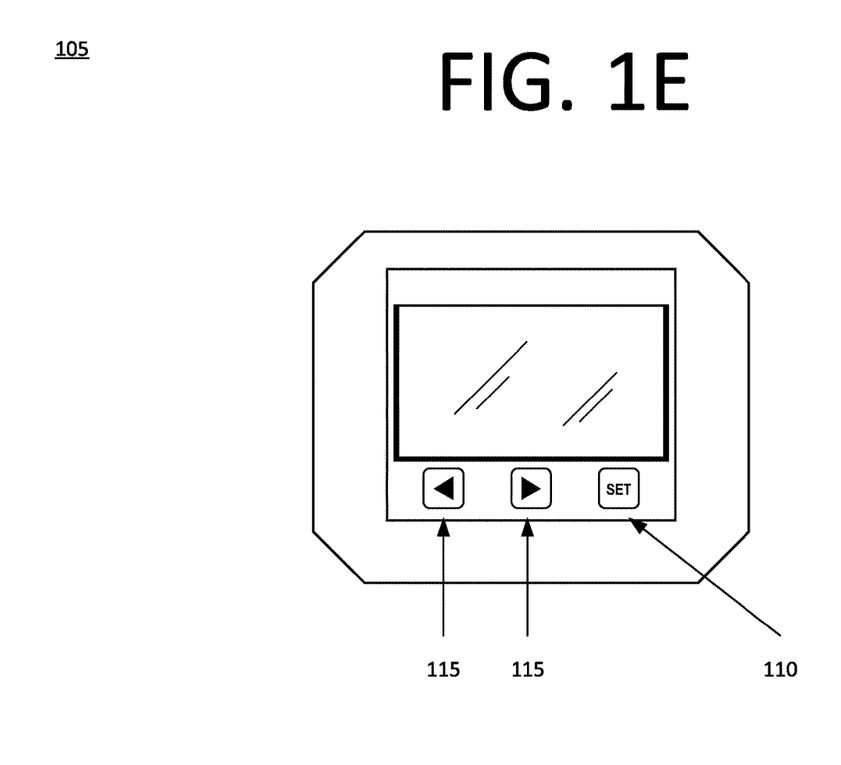
Figure 1F:
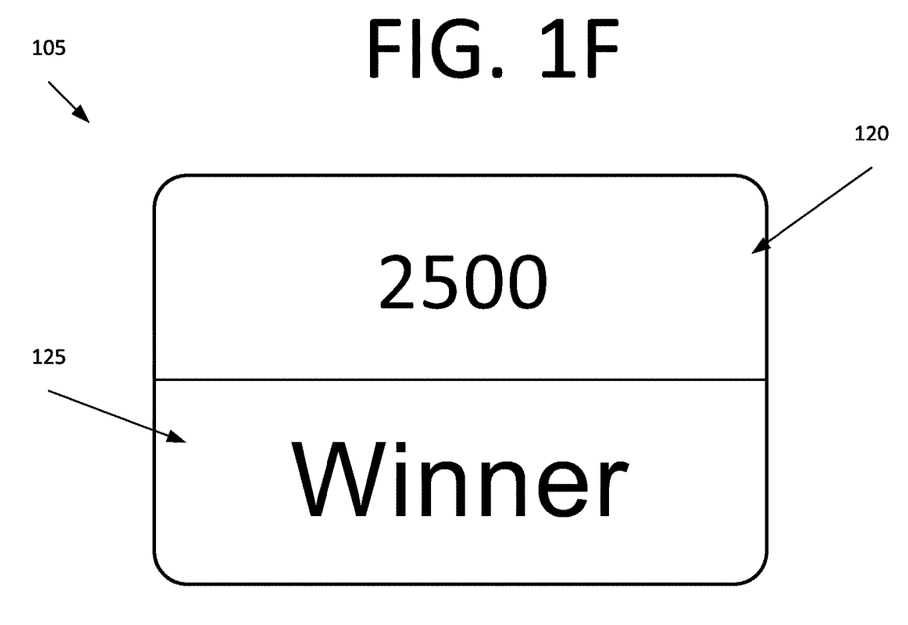

In one embodiment, display 105 is a liquid crystal display (LCD). See, for example, FIG. 1E. In other embodiments, display 105 may be a haptic display. The haptic display may allow the user to interact with shoe, eliminating the need for physical buttons. Display 105 may include a split screen feature, e.g., display a message on the first part 120 of display 105, and display the count on the second part 125 of display 105. See, for example, FIG. 1F. While FIG. 1F shows that first part 120 of display 105 is on top of second part 125 of display 105, the screen may be split in any manner. For example, in some embodiment, display 105 may be split side-by-side, i.e., first part 120 would be horizontally next to second part 125.

Returning to FIG. 1E, some embodiments include a "set" button 110 and "arrow" buttons 115. It should be appreciated that "arrow" buttons 115 may be "plus" and "minus" buttons in other embodiments. "Set" button 110 may allow the user to set, for example, the time zone, the date and/or time, a goal (e.g., the predefined number of steps), etc. "Arrow" buttons 115 may allow the user to change the time zone, the date and/or time, the goal, etc., when "set" button 110 is pressed. By allowing a user to set the time zone, shoe 100 may reset the number of steps to zero at midnight, thus renewing the steps each day. Stated differently, the number of steps taken during the day may reset to zero in any time zone at midnight.

Figure 2:
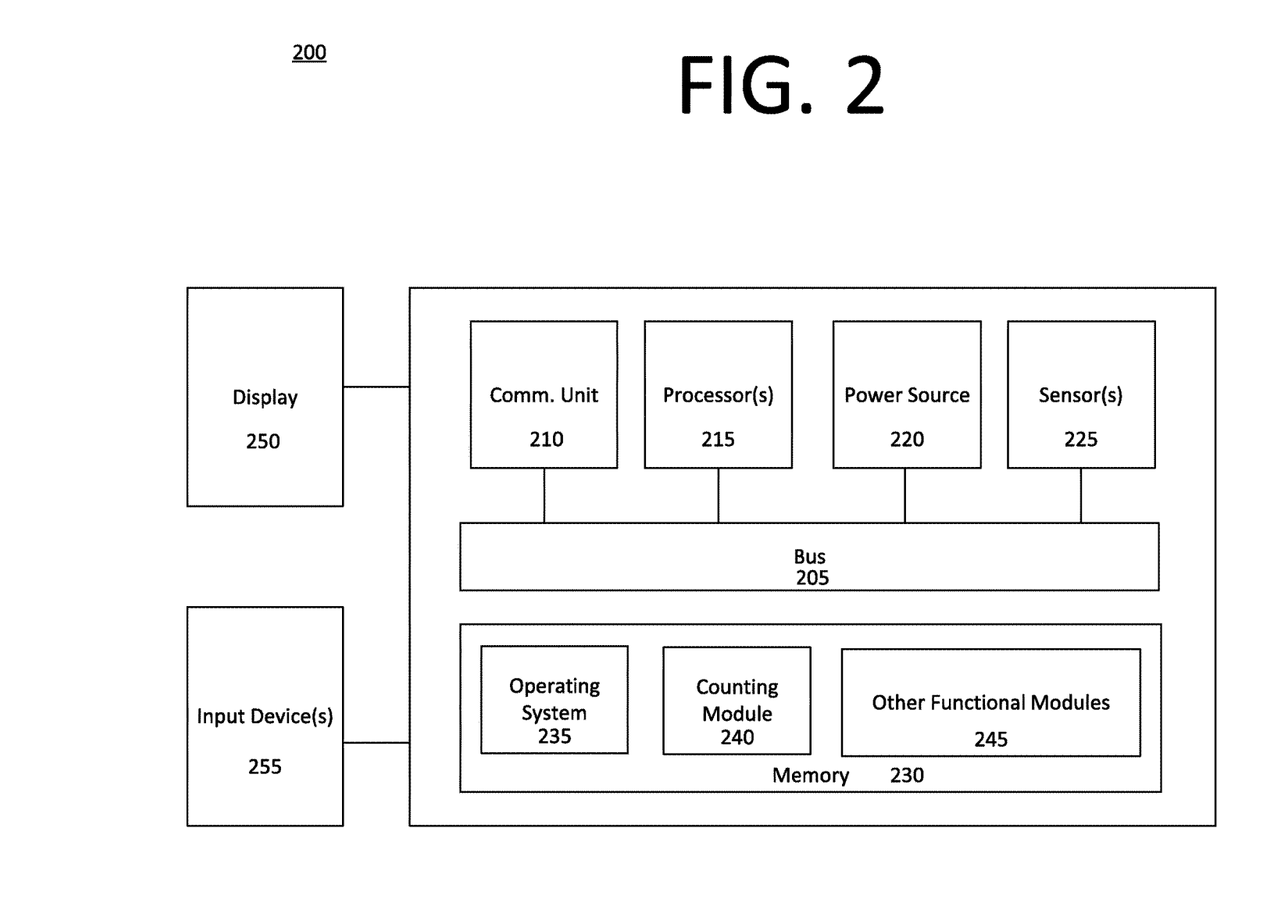
FIG. 2 is a block diagram illustrating a circuitry for the shoe, according to an embodiment of the present invention.

As mentioned above, shoe 100 also includes circuitry 135 for counting the steps. A more detailed description of the circuitry is provided below. FIG. 2 is a block diagram illustrating a circuitry 200 for the shoe, according to an embodiment of the present invention. Circuitry 200 includes a bus 205 or other communication mechanism for communicating information, and processor(s) 215 coupled to bus 205 for processing information.

Processor(s) 215 may be any type of general or specific purpose processor, including a central processing unit ("CPU") or application specific integrated circuit ("ASIC"). Processor(s) 215 may also have multiple processing cores, and at least some of the cores may be configured to perform specific functions. However, in order to reduce cost, processor(s) 215 may be a small microcontroller in many embodiments.

Circuitry 200 further includes memory 230 for storing information and instructions to be executed by processor(s) 215. Memory 230 may include any combination of random access memory ("RAM"), read only memory ("ROM"), flash memory, cache, static storage such as a magnetic or optical disk, or any other types of non-transitory computer-readable media or combinations thereof.

Additionally, circuitry 200 includes a communication device 210, such as a transceiver and/or antenna, to wirelessly provide access to a communications network, and connect to another device, such as a central server, computer system, mobile device, and/or charging station. Communication device 210 may also include a Bluetooth™ device configured to wirelessly connect to the other device(s). This would allow a user to keep track of the number of steps he or she takes in a day, for example, as well as share it with other users.

Non-transitory computer-readable media may be any available media that can be accessed by processor(s) 210 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 230 stores software modules that provide functionality when executed by processor(s) 215. The modules include an operating system 235 for operating circuitry 200. The modules also include a counting module (or counter) 240 configured to count the number of steps that a user takes during the predefined period of time. Counting module 240 may operate in conjunction with sensor(s) 225 is some embodiments.

In one embodiment, sensor(s) 225 may detect movement of the user's feet when the user is walking or running In such an embodiment, counting module 240 may increase the count for the number of steps each time sensor(s) 225 detects movement of the shoe. Sensor(s) 225 may also be referred to as a motion sensor(s) in some embodiments, and may be located on any part of the shoe. In this embodiment, the motion sensor(s) may be located with circuitry 200.

In other embodiments, sensor(s) 225 may be pressure sensor(s). In those embodiments, pressure sensor(s) may detect the force applied when a user's foot makes contact with the ground. This may allow counting module 240 to increase the count for the number of steps each time a predetermined amount of force is detected by pressure sensor(s). In some embodiments, pressure sensor(s) may be located in or near the sole of the shoe.

Sensor(s) 225 may also include induction sensor. The induction sensor may be placed near the sole of the shoe, or in the sole of the shoe. This allows the shoe to transfer data to a charging station when placed in proximity to the charging zone of the charging station. This also enables the shoe to recharge its power source 220, when the shoe is placed in proximity to the charging zone of the charging station.

Circuitry 200 may also include a power source 220. Power source 220 may be configured to power circuitry 200 when a switch (not shown) is pressed. Power source 220 may include replaceable batteries, rechargeable batteries, or both. As will be described below in further detail below, power source 220 may be charged via a charging station in some embodiments.

In some embodiments, switch may be part of input device(s) 255. Input device(s) 255 may include one or more buttons, such as a "set" button, "arrow" buttons, etc. The shoe may be activated by pressing any one of these buttons in certain embodiments. These buttons may also allow the user to configure the shoe. For example, as mentioned above, the "set" button allows the user to set parameters, such as date, time, time zone, predefined number of steps, predefined period of time (i.e., the time period for counting the number of steps), etc., on the shoe. The "arrow" buttons allows the user to, for example, increase or decrease the predefined number of steps, change the date, time, time zone, increase or decrease the period of time, etc. By allowing a user to increase or decrease the period of time, the user may be able to challenge himself or herself to complete a number of steps within a certain time period.

As briefly mentioned above, display 250 may be a LCD display, a haptic display, or any combination thereof. In the embodiments where physical buttons are not included on circuitry 200, the haptic display allows the user to interact with the shoe in a similar manner as discussed above. Display 250 also displays messages when counting module 240 determines that the counter is greater or equal to the predefined number of steps. Messages may include a congratulatory statement, the number of steps taken during the predefined period of time, the number of steps remaining before the counter reaches the predefined number of steps, etc. In a further embodiment, the message may notify the user that he or she is nearing their goal.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 3:
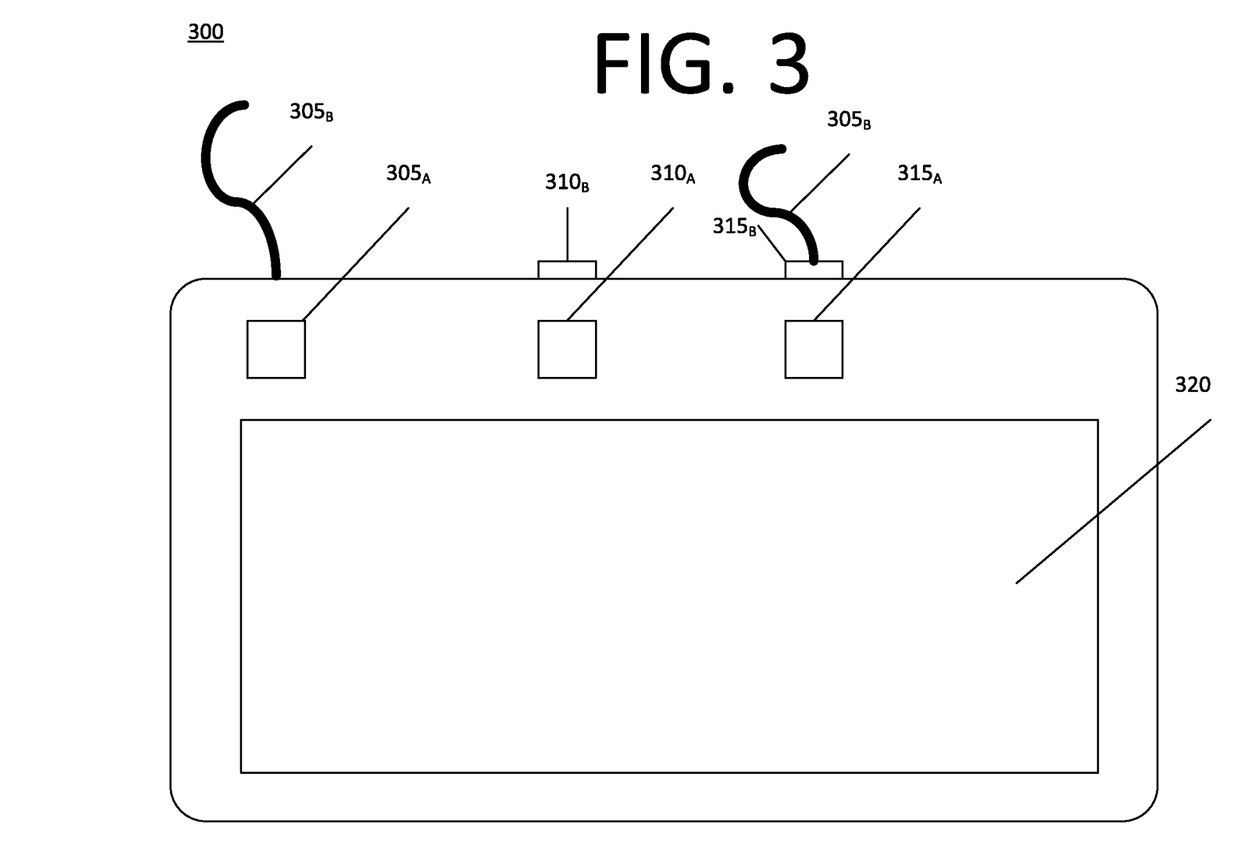
FIG. 3 illustrates a charging station for the shoe, according to an embodiment of the present invention.

FIG. 3 illustrates a charging station 300 for the pair of shoes, according to an embodiment of the present invention. Charging station 300 includes a plurality of lights and a plurality of switches or ports. For example, power switch $305_A$ may illuminate when power switch $305_A$ is pressed, i.e., activated, and a power cord $305_B$ is plugged into a wall outlet.

A communication light $310_A$ may be illuminated when communication switch $310_B$ is activated. For example, when communication switch $310_B$ is activated, charging station 300 may wirelessly communicate with the central server and/or the shoe. This allows charging station 300 to download any data from the memory of the shoe and upload the data to the central server or phone. It should also be appreciated that, upon completion of the download of the data, charging station 300 will transmit a message instructing the shoe to clear its memory. This will allow the downloaded data to be erased from the shoe freeing up space to store additional step information.

In some embodiments, communication light $310_A$ and communication switch $310_B$ may be the same component. Charging station 300 may also communicate with the central server via LAN connectivity. For example, when an Ethernet cable $315_C$ is plugged into port $315_B$, charging 300 may communicate with the central server. In this case, Ethernet connectivity light $315_A$ may illuminate.

In some embodiment, charging station 300 is configured to charge the power source of the shoe and/or download data from the shoe. For example, when the shoes are placed within a charging zone 320, charging station 300 may begin charging the shoes. Charging station 300 may include a pressure or weight sensor (not shown) to detect when the shoes are placed on charging zone 320. For example, when the pressure sensor detects that the shoes are placed on charging zone 320, charging station 300 may automatically connect with the power source of the shoe, and begin charging the power source of the shoe.

In one embodiment, charging station 300 may charge the shoe via induction based technology. The induction based technology allows transfer of data from charging station 300 to the shoe, and allow transfer of power from charging station 300 to the shoe, wirelessly. In this embodiment, the shoe soles (not shown) may include a coil and charging station 300 may include a coil (not shown). For example, when the shoes are placed on, or in proximity to, charging zone 320, the coils in the shoe and the coils in charging station 300 generate a magnetic effect allowing data and/or power to be exchanged between the shoe and charging station 300. In certain embodiments, a power supply cable may connect charging station 300 and the shoe, allowing the power source of the shoe to be recharged.

In some embodiments, charging zone 320 may include a magnetic device, and the shoes may be a magnetic device. This may work similar to the induction based technology described above. For example, when the shoes are placed on charging zone 320, the magnetic device of charging zone 320 and the magnetic device of the shoe cause charging station 300 to charge, using induction for example, the power source on the shoe, as well as download any data from the shoe.

Charging station 300 may also download data from the shoe, and update the data to a central database. For example, when the pressure sensor detects that the shoes are placed within charging zone 325, a communication unit (not shown) may automatically connect with the communication unit of the shoe, and begin downloading the data. The communication unit of the charging station 300 may connect to the communication unit of the shoe via Bluetooth™ Wi-Fi, or physical connection. The data may include the number of steps taken during the predefined period of time, whether the user completed the predefined number of steps, the time it took to complete the predefined number of steps, etc. Once the data is downloaded to a memory device (not shown) on charging station 300, the data may then be uploaded to the central database via Bluetooth™, Wi-Fi or LAN connection.

In certain embodiments, charging station 300 may play music, or any other type of audio, while the shoe is being charged or during the exchange of data. When the charge is complete, and/or when data transfer is complete, the music may automatically turn off This allows the user to be notified when the shoe charge or data transfer is complete. Although not illustrated, it should be appreciated that charging station 300 may include a volume button allowing volume to be increased or decreased.

Figure 4:
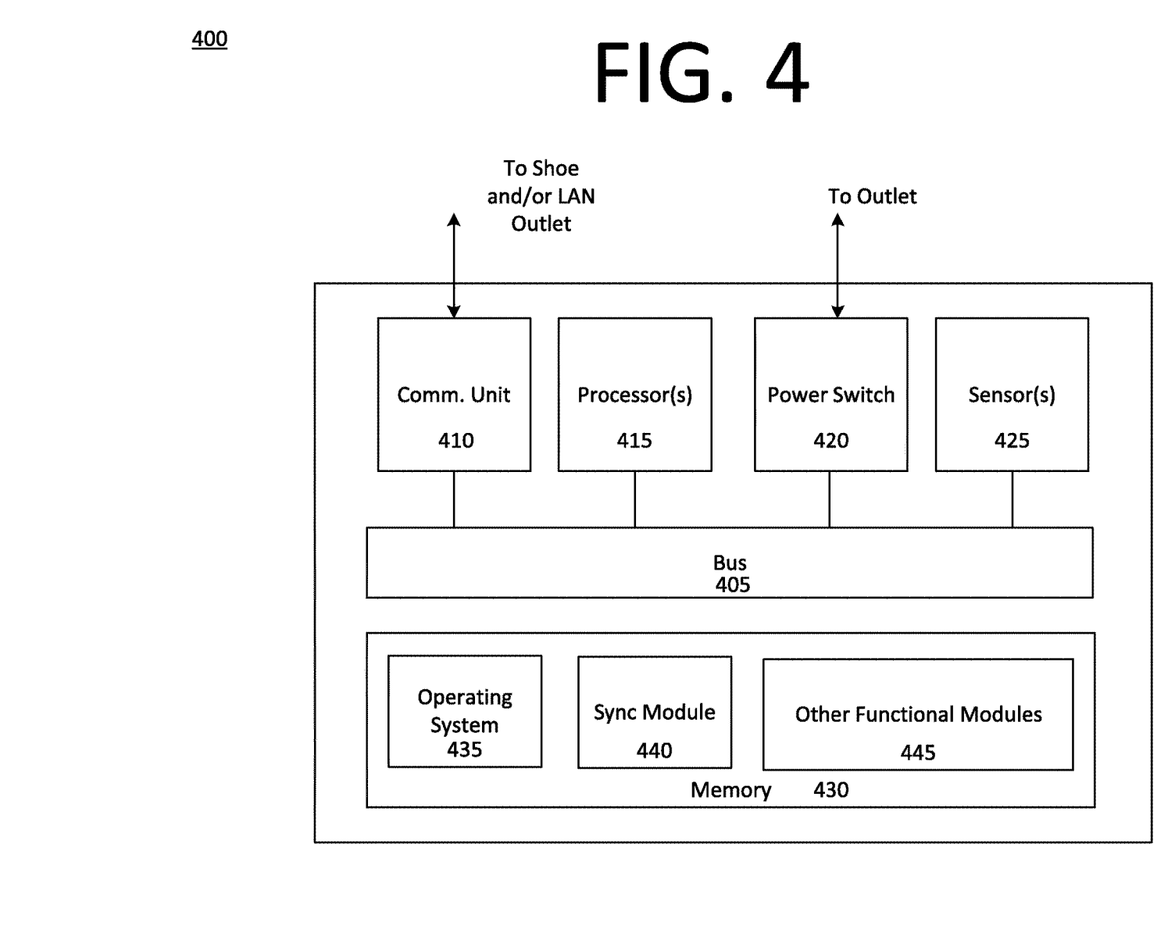
FIG. 4 is a block diagram illustrating a circuitry for the charging station, according to an embodiment of the present invention.

FIG. 4 is a block diagram illustrating a circuitry 400 for the charging station, according to an embodiment of the present invention. Circuitry 400 includes a bus 405 or other communication mechanism for communicating information, and processor(s) 415 coupled to bus 405 for processing information. Processor(s) 415 may be any type of general or specific purpose processor, including a central processing unit ("CPU") or application specific integrated circuit ("ASIC"). Processor(s) 415 may also have multiple processing cores, and at least some of the cores may be configured to perform specific functions. However, in order to reduce cost, processor(s) 415 may be a small microcontroller in many embodiments.

Additionally, circuitry 400 includes a communication unit 410 to connect to a central server (not shown) and/or shoe (not shown). Communication unit 410 may be a Blue Tooth™ device, Wi-Fi device or a LAN device. Circuitry 400 further includes memory 430 for storing information and instructions to be executed by processor(s) 415. Memory 430 may include any type of storage device.

Memory 430 stores software modules that provide functionality when executed by processor(s) 415. The modules include an operating system 435 for operating circuitry 400. The modules further include a charging/sync module 440 configured to charge the power source of the shoe, as well as retrieve data stored within the memory of the shoe. The functionality of the charging and transmission/reception of data is described above with respect to FIG. 3.

Circuitry 400 may also include one or more additional functional modules 445 that include additional functionality. For example, a music module may be included to play music or any other sound during the charging of the shoe or during the exchange of data from the shoe to the charging station.

Circuitry 400 also includes a power switch 420 configured to power circuitry 400 when power switch (or button) 420 is pressed. Power switch 420 may include a power cord configured to connect to a wall outlet, such as a power outlet, a universal serial bus (USB) outlet, or any type of power source.

As mentioned above, the charging station may include pressure sensor(s) or an induction sensor. In one embodiment, sensor(s) 425 may include pressure sensors that detect when the shoe is placed in the charging zone of the charging pad. In another embodiment, sensor(s) 425 may include induction sensor (or coils) that detects when the shoe is on the charging zone or in proximity to the charging zone. When the shoe is detected, the sensor(s) may activate communication unit 410 to download data from the memory of the shoe, and also clear any data stored in the shoe upon completion of the download. Also upon detection of the shoe, sensor(s) 425 may also cause the shoe power to be recharged. This can be achieve via communication unit 410.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In summary, a shoe may be configured to count a number of steps that the user takes during a predefined period of time. The shoe may also notify the user when the predefined number of steps have been met via a display. In some embodiments, the shoe may be charged on a shoe pad, allowing the predefined number of steps during the predefined period of time to be uploaded to a central server. This will allow a user to share his or her goals with other users.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:
1. A system, comprising:
   a shoe comprising
      a counter, embedded within the shoe, configured to count a number of steps taken during a predefined period of time,
      a display, embedded within the shoe and coupled to the counter, configured to display a message when the number of steps is greater or equal to a predefined number of steps;
      a set of buttons configured to allow a user to set a goal for the predefined number of steps, wherein
      the counter for counting the number of steps, the display for displaying the number of steps, and the set of buttons for setting the goal are embedded on a single circuitry, wherein the circuitry is embedded within the material of the shoe causing the display protrudes out of the shoe; and
   a charging pad configured to charge a power source within the shoe, and download step counting data from the shoe while charging the power source within the shoe, wherein the charging pad comprises
      a sensor configured to detect when the shoe is placed on the charging pad and within a charging zone, the charging zone being less than an entire area of the charging pad;
      a communication unit configured to activate when the shoe is placed on the charging pad and within the charging zone, and configured to connect wirelessly with the shoe to retrieve step counting data from the shoe; and
      a power supply configured to charge the power source of the shoe when the shoe is on the charging pad and placed within the charging zone.

2. The system of claim 1, wherein the charging station is further configured to charge the shoe through induction.

3. The system of claim 1, wherein the charging station is further configured to transmit the step counting data to a central server.

4. The apparatus of claim 1, wherein the charging station is further configured to detect whether the shoe is in a charging prior to charging the shoe.

* * * * *